(12) United States Patent
Sethi et al.

(10) Patent No.: US 11,954,479 B2
(45) Date of Patent: Apr. 9, 2024

(54) PREDICTING POST-UPGRADE OUTCOMES IN INFORMATION TECHNOLOGY ENVIRONMENTS THROUGH PROACTIVE UPGRADE ISSUE TESTING

(71) Applicant: Dell Products L.P., Round Rock, TX (US)

(72) Inventors: Parminder Singh Sethi, Ludhiana (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 191 days.

(21) Appl. No.: 17/570,419

(22) Filed: Jan. 7, 2022

(65) Prior Publication Data
US 2023/0221938 A1   Jul. 13, 2023

(51) Int. Cl.
*G06F 9/445* (2018.01)
*G06F 8/65* (2018.01)
*G06F 11/36* (2006.01)
*G06Q 10/0631* (2023.01)

(52) U.S. Cl.
CPC .............. *G06F 8/65* (2013.01); *G06F 11/368* (2013.01); *G06Q 10/06313* (2013.01)

(58) Field of Classification Search
CPC .... G06F 8/65; G06F 11/368; G06Q 10/06313
USPC .................................................. 717/168–178
See application file for complete search history.

(56) References Cited

U.S. PATENT DOCUMENTS

| | | | |
|---|---|---|---|
| 8,522,083 B1 * | 8/2013 | Cohen | G06F 9/44589 717/125 |
| 2009/0100420 A1 | 4/2009 | Sapuntzakis et al. | |
| 2009/0241099 A1 | 9/2009 | Lee et al. | |
| 2011/0296248 A1 | 12/2011 | Vidal et al. | |
| 2012/0054728 A1 * | 3/2012 | Rohde | G06F 8/65 717/168 |
| 2015/0347264 A1 | 12/2015 | Mohammed et al. | |
| 2016/0117163 A1 | 4/2016 | Fukui et al. | |
| 2017/0034023 A1 | 2/2017 | Nickolov et al. | |
| 2017/0255460 A1 * | 9/2017 | Frank | G06F 9/45558 |
| 2019/0339958 A1 | 11/2019 | Joshi et al. | |
| 2021/0004000 A1 | 1/2021 | Kalaskar et al. | |
| 2021/0255847 A1 | 8/2021 | Nerla et al. | |
| 2021/0334195 A1 | 10/2021 | Sethi et al. | |
| 2023/0115707 A1 | 4/2023 | Khan | |

* cited by examiner

*Primary Examiner* — Chuck O Kendall
(74) *Attorney, Agent, or Firm* — Chamberlain, Hrdlicka, White, Williams & Aughtry; Aly Z. Dossa

(57) ABSTRACT

A method and system for predicting post-upgrade outcomes in information technology environments through proactive upgrade issue testing. At least with respect to computing, an upgrade may entail the replacement of a product—in the form of hardware, software, and/or firmware—with a newer or better version, which may serve to bring the product up to date, improve the characteristic(s) of the product, and/or resolve any issue(s) inflicting the product. Further, the process of upgrading a product in view of an issue therein is often reactive—that is, it is often required that a customer experiences and reports an issue for a product to a vendor prior to the issuance of an upgrade to the customer that addresses the issue for the product by the vendor. Presently, what is lacking is a mechanism through which product upgrades may be presented to customers proactively in order to minimize product failure and/or downtime.

20 Claims, 12 Drawing Sheets

PREDICTING POST-UPGRADE OUTCOMES IN INFORMATION TECHNOLOGY ENVIRONMENTS THROUGH PROACTIVE UPGRADE ISSUE TESTING

BACKGROUND

At least with respect to computing, an upgrade may entail the replacement of a product—in the form of hardware, software, and/or firmware—with a newer or better version, which may serve to bring the product up to date, improve the characteristic(s) of the product, and/or resolve any issue(s) inflicting the product.

SUMMARY

In general, in one aspect, the invention relates to a method for managing upgrades for enterprise information technology (IT) products. The method includes detecting, from a customer, a customer intent to upgrade a currently installed version of an enterprise IT product to an upgrade version; identifying, based on the upgrade version, a set of customer issue database entries; identifying a set of upgrade issue tests respectively mapped to the set of customer issue database entries; conducting the set of upgrade issue tests to obtain an upgrade assessment; making a determination that the upgrade assessment is representative of a failing assessment; and advising the customer, based on the determination, to postpone upgrading the enterprise IT product to the upgrade version until a custom version is available.

In general, in one aspect, the invention relates to a non-transitory computer readable medium (CRM). The non-transitory CRM includes computer readable program code, which when executed by a computer processor, enables the computer processor to perform a method for managing upgrades for enterprise information technology (IT) products. The method includes detecting, from a customer, a customer intent to upgrade a currently installed version of an enterprise IT product to an upgrade version; identifying, based on the upgrade version, a set of customer issue database entries; identifying a set of upgrade issue tests respectively mapped to the set of customer issue database entries; conducting the set of upgrade issue tests to obtain an upgrade assessment; making a determination that the upgrade assessment is representative of a failing assessment; and advising the customer, based on the determination, to postpone upgrading the enterprise IT product to the upgrade version until a custom version is available.

In general, in one aspect, the invention relates to a system. The system includes a customer environment including a computer processor; and a product upgrade client executing on the computer processor and programmed to perform a method for managing upgrades for enterprise information technology (IT) products. The method includes detecting, from a customer administrating the customer environment, a customer intent to upgrade a currently installed version of an enterprise IT product to an upgrade version; identifying, based on the upgrade version, a set of customer issue database entries; identifying a set of upgrade issue tests respectively mapped to the set of customer issue database entries; conducting the set of upgrade issue tests to obtain an upgrade assessment; making a determination that the upgrade assessment is representative of a failing assessment; and advising, based on the determination, the customer to postpone upgrading the enterprise IT product to the upgrade version until a custom version is available.

Other aspects of the invention will be apparent from the following description and the appended claims.

DETAILED DESCRIPTION

Figure 1:
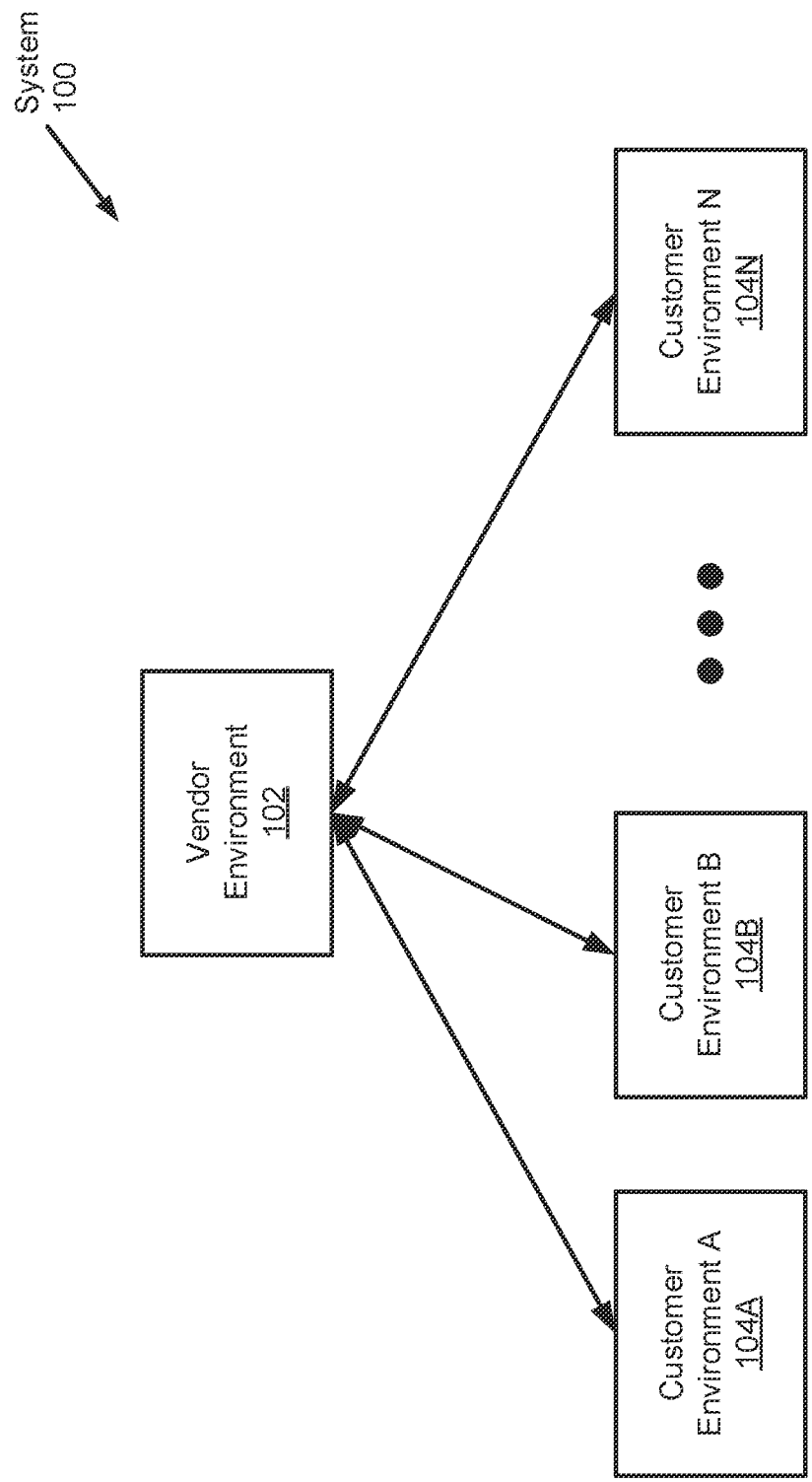
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for predicting post-upgrade outcomes in information technology (IT) environments through proactive upgrade issue testing. At least with respect to computing, an upgrade may entail the replacement of a product—in the form of hardware, software, and/or firmware—with a newer or better version, which may serve to bring the product up to date, improve the characteristic(s) of the product, and/or resolve any issue(s) inflicting the product. Further, the process of upgrading a product in view of an issue therein is often reactive—that is, it is often required that a customer experiences and reports an issue for a product to a vendor prior to the issuance of an upgrade to the customer that addresses the issue for the product by the vendor. Presently, what is lacking is a mechanism through which product upgrades may be presented to customers proactively in order to minimize product failure and/or downtime. To that extent, the disclosed method and system propose a framework directed to conducting tests within customer IT environments—the results of which may be scored to foresee whether any existing environmental factor(s) thereon may cause prospective product upgrades to fail.

FIG. 1 shows a system in accordance with one or more embodiments of the invention. The system (100) may include a vendor environment (102) operatively connected to a collection of (e.g., at least two) customer environments (104A-104N). Each of these system (100) components is described below.

In one embodiment of the invention, the vendor environment (102) may represent any privately owned and maintained enterprise information technology (IT) environment belonging to an enterprise IT vendor. An enterprise IT vendor, in turn, may refer to any organization or entity whom may sell, or otherwise provide and maintain, enterprise IT products and/or services. Further, the vendor environment (102) may be implemented through on-premises infrastructure, cloud computing infrastructure, or any hybrid infrastructure thereof. The vendor environment (102), accordingly, may be implemented using one or more network servers (not shown), where each network server may represent a physical or a virtual network server. Additionally, or alternatively, the vendor environment (102) may be implemented using one or more computing systems similar to the exemplary computing system shown in FIG. 7. The vendor environment (102) is described in further detail below with respect to FIG. 2A.

In one embodiment of the invention, a customer environment (104A-104N) may represent any privately owned and maintained enterprise IT environment belonging to an enterprise IT customer. An enterprise IT customer, in turn, may refer to any organization or entity whom may purchase, or otherwise obtain and employ, enterprise IT products and/or services. Further, a customer environment (104A-104N) may be implemented through on-premises infrastructure, cloud computing infrastructure, or any hybrid infrastructure thereof. A customer environment (104A-104N), accordingly, may be implemented using one or more network servers (not shown), where each network server may represent a physical or a virtual network server. Additionally, or alternatively, a customer environment (104A-104N) may be implemented using one or more computing systems similar to the exemplary computing system shown in FIG. 7. The customer environment (104A-104N) is described in further detail below with respect to FIG. 2B.

In one embodiment of the invention, a customer environment (104A-104N) hereinafter may be classified as either a pre-upgrade customer environment or a post-upgrade customer environment. A pre-upgrade customer environment may refer to any customer environment (104A-104N) that has not yet pursued the installation of a given enterprise IT product and/or service. On the other hand, a post-upgrade customer environment may alternatively refer to any customer environment (104A-104N) that has completed the installation of the given enterprise IT product and/or service.

In one embodiment of the invention, the above-mentioned system (100) components may communicate with one another through a network (not shown) (e.g., a local area network (LAN), a wide area network (WAN) such as the Internet, a mobile network, any other communication network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, in communicating with one another, the above-mentioned system (100) components may employ any combination of wired and/or wireless communication protocols.

While FIG. 1 shows a configuration of components, other system (100) configurations may be used without departing from the scope of the invention.

Figure 2A:
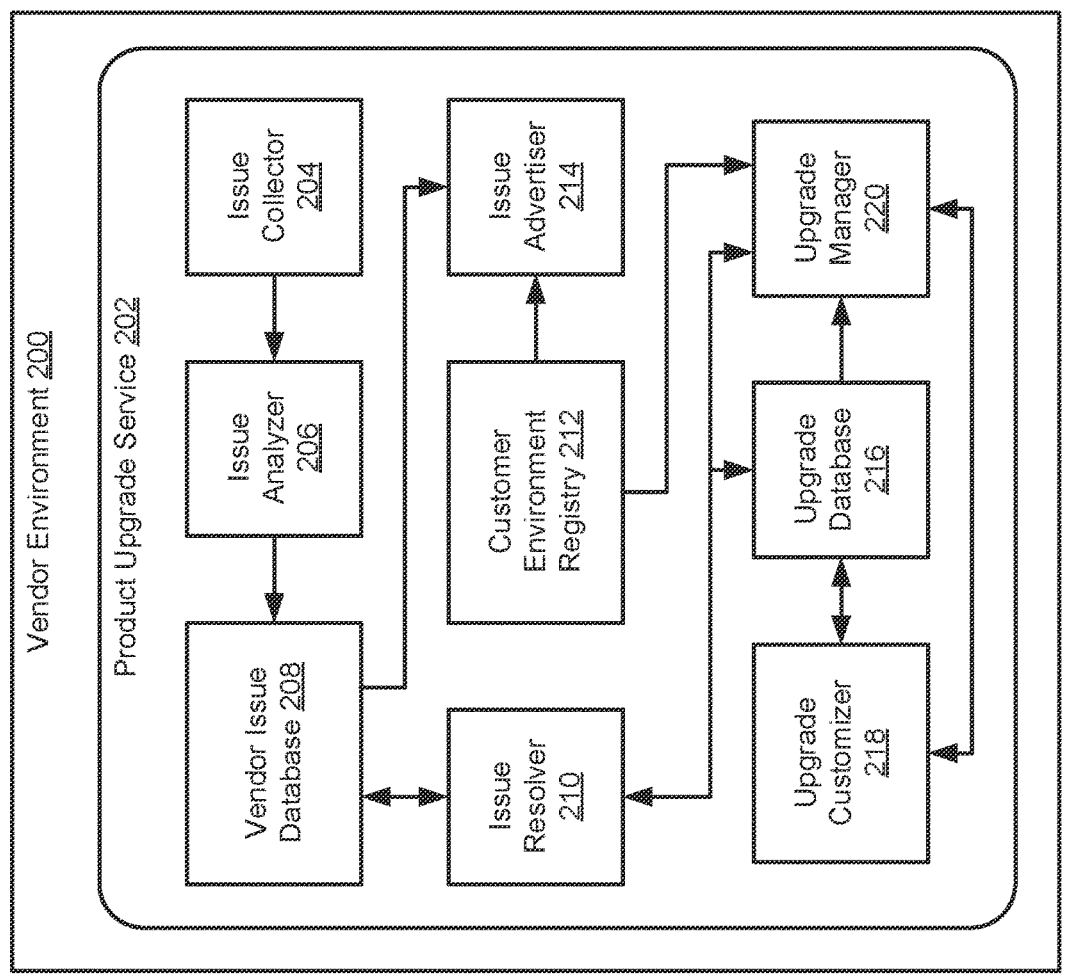
FIG. 2A shows a vendor environment in accordance with one or more embodiments of the invention.

FIG. 2A shows a vendor environment in accordance with one or more embodiments of the invention. The vendor environment (200) may include a product upgrade service (202). The product upgrade service (202) may represent a physical and/or logical server-side component of a distributed application structure (or a client-server application architecture), which may be configured to provide one or more resources and/or services pertinent to upgrading enterprise IT environment products. Further, the product upgrade service (202) may include an issue collector (204), an issue analyzer (206), a vendor issue database (208), an issue resolver (210), a customer environment registry (212), an issue advertiser (214), an upgrade database (216), an upgrade customizer (218), and an upgrade manager (220). Each of these product upgrade service (202) subcomponents is described below.

In one embodiment of the invention, the issue collector (204) may refer to a computer program that may execute on the underlying hardware of the vendor environment (200), which may be responsible for gathering upgrade issues (described below). To that extent, the issue collector (204) may include functionality to: receive, via a network, one or more upgrade issues from (or reported by) one or more post-upgrade customer environments (described above); and provide the received upgrade issue(s) to the issue analyzer (206) for processing. Further, one of ordinary skill will appreciate that the issue collector (204) may perform other functionalities without departing from the scope of the invention.

In one embodiment of the invention, an upgrade issue may refer to any problem arising from the installation of any upgrade for any enterprise IT environment product. Said product may either entail a physical (e.g., computing hardware) or logical (e.g., computing software and/or firmware) component of an enterprise IT environment. Further, upgrade issues may be categorized into one of two classifications: an environmental upgrade issue, or a non-environmental upgrade issue. The former may encompass any post-installation (or post-upgrade) problem specific to or experienced by a single enterprise IT environment—examples of which may include, but are not limited to, a lack of permissions to access one or more directories, a lack of storage space to accommodate a logical upgrade installation, and any thermal rises across hardware components. The latter, meanwhile, may encompass any post-installation (or post-upgrade) problem commonly experienced across multiple enterprise IT environments—examples of which may include, but are not limited to, installation package errors that may hinder the installation, in part or in whole, of a logical upgrade; and any upgrade incompatibilities with an operating system and/or hardware configuration.

In one embodiment of the invention, the issue analyzer (206) may refer to a computer program that may execute on the underlying hardware of the vendor environment (200), which may be responsible for evaluating upgrade issues (described above). To that extent, the issue analyzer (206) may include functionality to: obtain one or more upgrade issues from the issue collector (206); assess the upgrade issue(s) to obtain issue metadata descriptive of the upgrade issue(s) (e.g., issue ID, issue class, issue description, issue report data, etc. (see e.g., FIG. 3A)); and deposit and maintain the obtained issue metadata within the vendor issue database (208). Further, one of ordinary skill will appreciate that the issue analyzer (206) may perform other functionalities without departing from the scope of the invention.

In one embodiment of the invention, the vendor issue database (208) may refer to physical data storage (or logical data storage occupying at least a portion of the physical data storage) on the vendor environment (200), where issue metadata, pertinent to one or more upgrade issues reported by one or more post-upgrade customer environments, may be consolidated. At any given point-in-time, each upgrade issue, maintained in the vendor issue database (208), may be marked (via at least a portion of its respective issue metadata) as being unresolved or resolved. Further, the vendor issue database (208) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The vendor issue database (208) is described in further detail below with respect to FIG. 3A.

In one embodiment of the invention, the issue resolver (210) may refer to a computer program that may execute on the underlying hardware of the vendor environment (200), which may be responsible for patching upgrade issues. Depending on the given upgrade issue being patched, the issue resolver (210) may or may not solicit aid or assistance from one or more human elements (e.g., support technicians, engineers, etc.). To that extent, the issue resolver may include functionality to: retrieve issue metadata, pertinent to one or more unresolved (or unpatched) upgrade issues, from the vendor issue database (208); resolve the unresolved/unpatched upgrade issue(s) based on at least a portion of the retrieved issue metadata to generate product upgrade(s) (e.g., reflecting new version(s) of given enterprise IT product(s), which may or may not address the unresolved/unpatched upgrade issue(s)); update the vendor issue database (208) using product upgrade metadata descriptive of the generated product upgrade(s); deposit and maintain the product upgrade(s), as well as the associated product upgrade metadata, within the upgrade database (216); and notify the upgrade manager (220) of the resolution of the unresolved/unpatched upgrade issue(s). Further, one of ordinary skill will appreciate that the issue resolver (210) may perform other functionalities without departing from the scope of the invention.

In one embodiment of the invention, the customer environment registry (212) may refer to physical data storage (or logical data storage occupying at least a portion of the physical data storage) on the vendor environment (200), where information, reflective of or pertinent to one or more customer environments, may be consolidated. Said information, for any given customer environment, may include, but is not limited to: a customer identifier (ID) assigned to the given customer environment; a current or known configuration of physical and/or logical enterprise IT products installed on/at the given customer environment; and networking details (e.g., Internet Protocol (IP) address(es), application programming interface(s) (API(s)), etc.) for facilitating communications with the given customer environment via a network. One of ordinary skill will appreciate that, for any given customer environment, the customer environment registry (212) may include additional, or alternative, information without departing from the scope of the invention. Further, the customer environment registry (212) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the issue advertiser (214) may refer to a computer program that may execute on the underlying hardware of the vendor environment (200), which may be responsible for advertising known or reported upgrade issues. To that extent, the issue advertiser (214) may include functionality to: identify, either periodically or on-demand, one or more upgrade issues (maintained on the vendor issue database (208)) that has/have yet to be advertised using issue metadata thereof; retrieve at least a portion of the issue metadata for the yet-to-be advertised upgrade issue(s) from the vendor issue database (208); identify one or more pre-upgrade customer environments, relevant to the yet-to-be advertised upgrade issue(s), from the customer environment registry (212); share or transmit the yet-to-be advertised upgrade issue(s), as well as the their respective retrieved issue metadata portion(s), to the identified pre-upgrade customer environment(s) via a network; and update the vendor issue database (208) to reflect that the yet-to-be advertised upgrade issue(s) has/have been advertised. Further, one of ordinary skill will appreciate that the issue advertiser (214) may perform other functionalities without departing from the scope of the invention.

In one embodiment of the invention, the upgrade database (216) may refer to physical data storage (or logical data storage occupying at least a portion of the physical data storage) on the vendor environment (200), where one or more product upgrades, including associated product upgrade metadata, may be consolidated. Further, the upgrade database (216) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The upgrade database (216) is described in further detail below with respect to FIG. 3B.

In one embodiment of the invention, the upgrade customizer (218) may refer to a computer program that may execute on the underlying hardware of the vendor environment (200), which may be responsible for customizing product upgrades. To that extent, for any given product upgrade customization order, the upgrade customizer (218) may include functionality to: receive, from the upgrade manager (220) and relevant to the given product upgrade customization order, one or more issue identifiers (IDs) assigned to one or more reported or known upgrade issues, respectively, and an upgrade version associated with an existing product upgrade; identify an upgrade database entry of the upgrade database (216) mapped to the received upgrade version; obtain one or more addressed issue IDs, associated with one or more reported/known upgrade issues, respectively, addressed by the upgrade version from the identified upgrade database entry; compare the received issue ID(s) and the addressed issue ID(s) to obtain one or more unaddressed issue IDs assigned to one or more reported/known upgrade issues, respectively, not addressed by the upgrade version; modify or customize the existing product upgrade (reflective of the upgrade version) to produce a custom product upgrade (reflective of a custom upgrade version) such that the custom product upgrade resolves the upgrade issue(s) associated with the unaddressed issue ID(s); deposit and maintain the custom product upgrade within the upgrade database (216); and provide the custom product upgrade (or an installation package thereof) to the upgrade manager (220). Further, one of ordinary skill will appreciate that the upgrade customizer (218) may perform other functionalities without departing from the scope of the invention.

In one embodiment of the invention, the upgrade manager (220) may refer to a computer program that may execute on the underlying hardware of the vendor environment (200), which may be responsible for processing upgrade requests. To that extent, the upgrade manager (220) may include functionality to: receive, from any pre-upgrade customer environment, an upgrade request that may reflect an upgrade version (for an existing product upgrade) and may or may not include an upgrade assessment; should the upgrade request lack the upgrade assessment, retrieve the existing product upgrade from the upgrade database (216) based on the upgrade version; and provide the existing product upgrade (or an installation package thereof) to the pre-upgrade customer environment; alternatively, should the upgrade request include the upgrade assessment, examine the upgrade assessment to obtain one or more issue identifiers (IDs) assigned to one or more reported or known upgrade issues, respectively; provide the upgrade version and the issue ID(s) to the upgrade customizer (218); in return, obtain a custom product upgrade (associated with a custom upgrade version) (or an installation package thereof) from the upgrade customizer (218); and provide the custom product upgrade (or the installation package thereof) to the pre-upgrade customer environment. The upgrade manager (220) may include further functionality to: receive, from the issue resolver (210), a new product upgrade (or an installation package thereof) that may or may not address one or more upgrade issues reported by at least one post-upgrade customer environment; and provide the new product upgrade to the at least one post-upgrade customer environment. Further, one of ordinary skill will appreciate that the upgrade manager (220) may perform other functionalities without departing from the scope of the invention.

While FIG. 2A shows a configuration of subcomponents, other vendor environment (200) configurations may be used without departing from the scope of the invention.

Figure 2B:
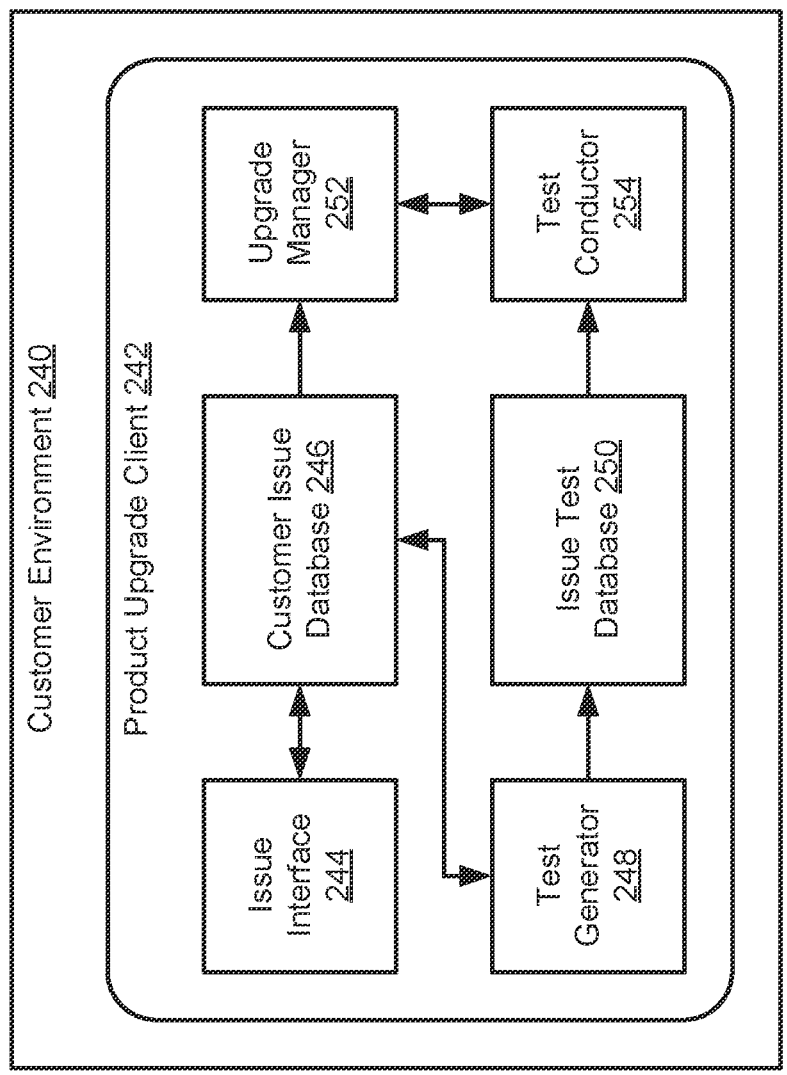
FIG. 2B shows a customer environment in accordance with one or more embodiments of the invention.

FIG. 2B shows a customer environment in accordance with one or more embodiments of the invention. The customer environment (240) may include a product upgrade client (242). The product upgrade client (242) may represent a physical and/or logical client-side component of a distributed application structure (or a client-server application architecture), which may be configured to employ one or more resources and/or services pertinent to upgrading enterprise IT environment products. Further, the product upgrade client (242) may include an issue interface (244), a customer issue database (246), a test generator (248), an issue test database (250), an upgrade manager (252), and a test conductor (254). Each of these product upgrade client (242) subcomponents is described below.

In one embodiment of the invention, the issue interface (244) may refer to networking hardware (e.g., network card or adapter), a computer program implementing a logical interface that may execute on the underlying hardware of the customer environment (240), an interactivity protocol, or any combination thereof, which may be responsible for facilitating the communication of information, pertinent to one or more upgrade issues, between the product upgrade client (242) on the customer environment (240) and the product upgrade service on the vendor environment (see e.g., FIG. 2A). To that extent, the issue interface (244) may include functionality to: receive issue metadata (or at least a portion thereof), descriptive of reported or known upgrade issue(s), from the product upgrade service; update the customer issue database (246) using the received issue metadata; and report, to the product upgrade service, any upgrade issues experienced on the customer environment (240) following the installation of one or more enterprise IT products. Further, one of ordinary skill will appreciate that the issue interface (244) may perform other functionalities without departing from the scope of the invention.

In one embodiment of the invention, the customer issue database (246) may refer to physical data storage (or logical data storage occupying at least a portion of the physical data storage) on the customer environment (240), where issue metadata, pertinent to one or more upgrade issues reported by one or more post-upgrade customer environments, may be consolidated. Further, the customer issue database (246) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The customer issue database (246) is described in further detail below with respect to FIG. 3C.

In one embodiment of the invention, the test generator (248) may refer to a computer program that may execute on the underlying hardware of the customer environment (240), which may be responsible for creating upgrade issue tests. To that extent, for any given upgrade issue, the test generator (248) may include functionality to: retrieve issue metadata, pertinent to the given upgrade issue, from the customer issue database (246); generate an upgrade issue test, relevant to the given upgrade issue, based on at least a portion of the retrieved issue metadata; and deposit and maintain the generated upgrade issue test within the issue test database (250). Further, one of ordinary skill will appreciate that the test generator (248) may perform other functionalities without departing from the scope of the invention.

In one embodiment of the invention, the issue test database (250) may refer to physical data storage (or logical data storage occupying at least a portion of the physical data storage) on the customer environment (240), where upgrade issue tests, relevant to one or more upgrade issues reported by one or more post-upgrade customer environments, may be consolidated. Further, the issue test database (250) may, at least in part, be implemented using persistent storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM). The issue test database (250) is described in further detail below with respect to FIG. 3D.

In one embodiment of the invention, the upgrade manager (252) may refer to a computer program that may execute on the underlying hardware of the customer environment (240), which may be responsible for product upgrade management across the customer environment (240). To that extent, for any given enterprise IT product currently installed within the customer environment (240), the upgrade manager (252) may include functionality to: detect customer (e.g., user or administrator) intent to upgrade the given enterprise IT product, where the customer intent references a sought later version (also referred to as an upgrade version) to a currently installed version of the given enterprise IT product; identity one or more customer issue database entries in the customer issue database (246) that may be associated with the upgrade version; provide the identified customer issue database entry/entries (or references thereto) to the test conductor (254) for processing; in return and from the test conductor (254), receive an upgrade assessment scoring an environmental compatibility of a prospective product upgrade with the customer environment (240); making a determination whether the upgrade assessment reflects a passing assessment; based on the determination, should the upgrade assessment reflect a passing assessment, generate an upgrade request including the upgrade version; alternatively, based on the determination, should the upgrade assessment reflect a non-passing (or failing) assessment, advise the customer to hold or postpone upgrading the given enterprise IT product using the upgrade version thereof; and generate an upgrade request including the upgrade version and the upgrade assessment; provide the generated upgrade request to the product upgrade service; in return and from the product upgrade service, receive a product upgrade associated with either the upgrade version or a custom version of the given enterprise IT product; and apply the product upgrade onto the customer environment (240). Further, one of ordinary skill will appreciate that the upgrade manager (252) may perform other functionalities without departing from the scope of the invention.

In one embodiment of the invention, the test conductor (254) may refer to a computer program that may execute on the underlying hardware of the customer environment (240), which may be responsible for scoring the environmental compatibility of one or more prospective product upgrades with the customer environment (240). To that extent, for any prospective product upgrade (referenced by a given upgrade version), the test conductor (254) may include functionality to: obtain one or more customer issue database entries (or reference(s) thereto) from the upgrade manager (252), where each customer issue database entry may be associated with the given upgrade version; identify one or more issue test database entries in the issue test database (250) that may map to the obtained customer issue database entry (entries) (or the reference(s) thereto); retrieve one or more issue tests from the identified issue test database entry (entries), respectively; conduct or perform the retrieved upgrade issue test(s) to obtain an upgrade assessment scoring an environmental compatibility of the given upgrade version with the customer environment (240); and provide the obtained upgrade assessment to the upgrade manager (252) for examination. Further, one of ordinary skill will appreciate that the test conductor (254) may perform other functionalities without departing from the scope of the invention.

While FIG. 2B shows a configuration of subcomponents, other customer environment (240) configurations may be used without departing from the scope of the invention.

Figure 3A:
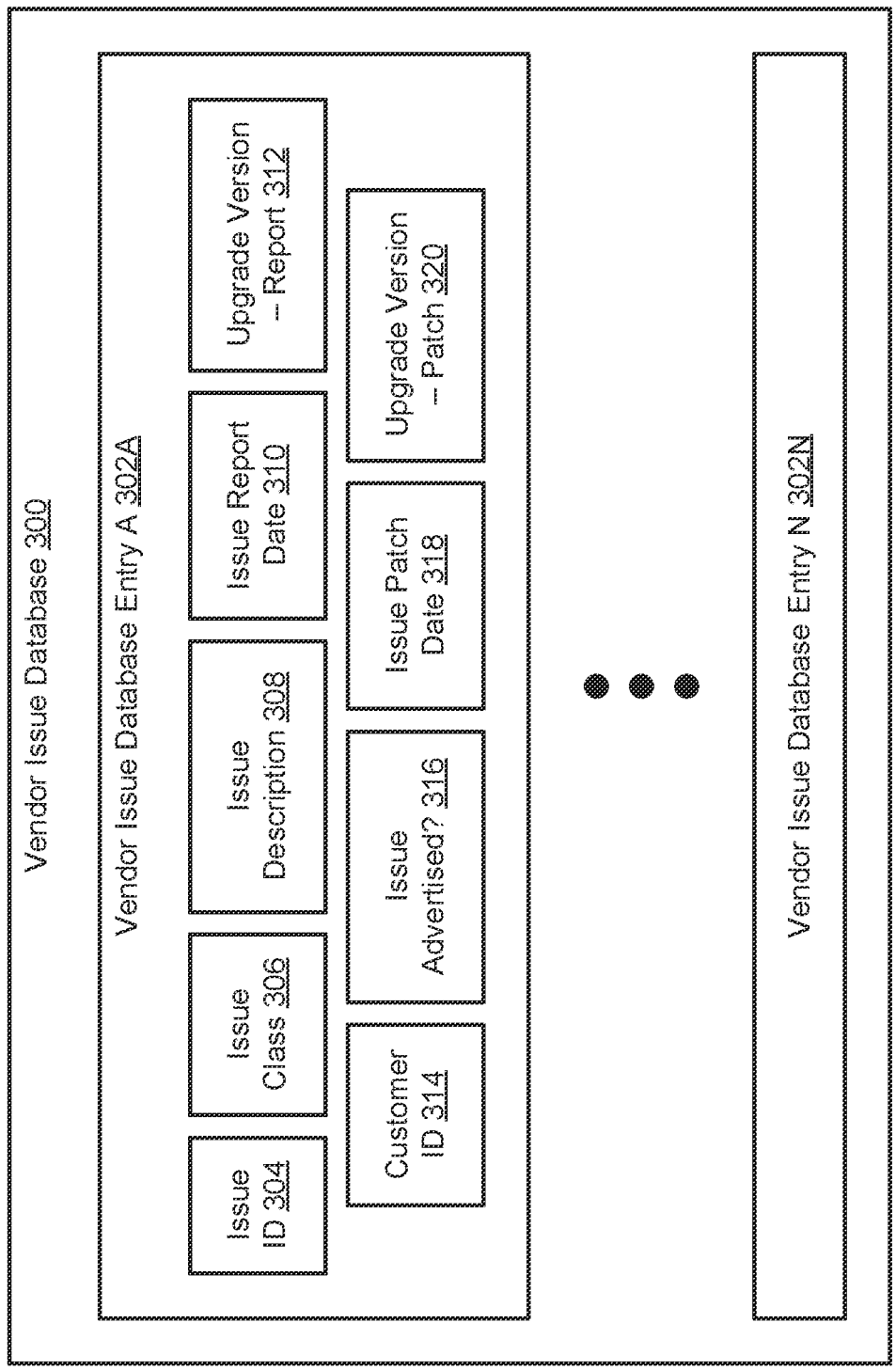
FIG. 3A shows a vendor issue database in accordance with one or more embodiments of the invention.

FIG. 3A shows a vendor issue database in accordance with one or more embodiments of the invention. The vendor issue database (300) may maintain issue metadata pertinent to one or more upgrade issues reported by one or more post-upgrade customer environments (described above) (see e.g., FIG. 1). Each upgrade issue, and thus the issue metadata descriptive thereof, may be consolidated within a given vendor issue database entry (302A-302N). For a given upgrade issue, the associated vendor issue database entry (302A-302N) may include, but is not limited to, an issue identifier (ID) (304), an issue class (306), an issue description (308), an issue report data (310), a report-relevant upgrade version (312), a set of customer IDs (314), an issue advertised flag (316), an issue patch date (318), and a patch-relevant upgrade version (320). Each of these vendor issue database entry (302A-302N) elements is described below.

In one embodiment of the invention, the issue ID (304) may refer to a unique character string (e.g., an ordered set of characters, where each character may reflect a letter, a number, or a symbol) assigned to and that identifies the given upgrade issue.

In one embodiment of the invention, the issue class (306) may refer to a classification, or type, of upgrade issue to which the given upgrade issue belongs. The issue class (306) may reflect one of two issue classifications—an environmental upgrade issue or a non-environmental upgrade issue. An environmental upgrade issue may encompass any post-installation (or post-upgrade) problem specific to or experienced by a single enterprise IT environment—examples of which may include, but are not limited to, a lack of permissions to access one or more directories, a lack of storage space to accommodate a logical upgrade installation, and any thermal rises across hardware components. The latter, meanwhile, may encompass any post-installation (or post-upgrade) problem commonly experienced across multiple enterprise IT environments—examples of which may include, but are not limited to, installation package errors that may hinder the installation, in part or in whole, of a logical upgrade; and any upgrade incompatibilities with an operating system and/or hardware configuration.

In one embodiment of the invention, the issue description (308) may refer to a concise statement (e.g., one to three sentences) that details the nature or context surrounding the given upgrade issue.

In one embodiment of the invention, the issue report date (310) may refer to a timestamp encoding an earliest date and/or time on which the given upgrade issue had been reported.

In one embodiment of the invention, the report-relevant upgrade version (312) may refer to a version number assigned to a version of a given enterprise IT product that, when installed on one or more customer environments, manifested or caused the given upgrade issue thereon (which ultimately led to the given upgrade issue being reported). In turn, a version number may refer to a sequence of numbers that identifies a given developmental state of the version of the given enterprise IT product.

In one embodiment of the invention, a customer ID (314) may refer to a unique character string (e.g., an ordered set of characters, where each character may reflect a letter, a number, or a symbol) assigned to and that identifies a customer environment (or more specifically, a post-upgrade customer environment). When the given upgrade issue is reported by multiple post-upgrade customer environments, the vendor issue database entry (302A-302N), pertaining to the given upgrade issue, may specify multiple customer IDs (314).

In one embodiment of the invention, the issue advertised flag (316) may refer to a tristate variable that reflects whether the given upgrade issue had been advertised to one or more pre-upgrade customer environments. The three states of the issue advertised flag (316) may include: a Boolean TRUE value indicating that the given upgrade issue has already been advertised; a Boolean FALSE value indicating that the given upgrade issue has not yet been advertised; and an indeterminate NAN value indicating that advertisement of the given upgrade issue is invalid or not applicable. Further, the issue advertised flag (316) may reflect either the Boolean TRUE value or the Boolean FALSE value if the issue class (306) indicates that the given upgrade issue is representative of an environmental upgrade issue. Alternatively, the issue advertised flag (316) may always reflect an indeterminate NAN value if the issue class (306) indicates that the given upgrade issue is instead representative of a non-environmental upgrade issue.

In one embodiment of the invention, the issue patch date (318) may refer to a timestamp encoding a creation (or release) date and/or time on which a patch or fix for the given upgrade issue had been introduced.

In one embodiment of the invention, the patch-relevant upgrade version (320) may refer to a version number (described above) assigned to a version of a given enterprise IT product, which may include a patch that addresses or resolves the given upgrade issue.

While FIG. 3A shows a configuration of subcomponents, other vendor issue database (300) configurations may be used without departing from the scope of the invention.

Figure 3B:
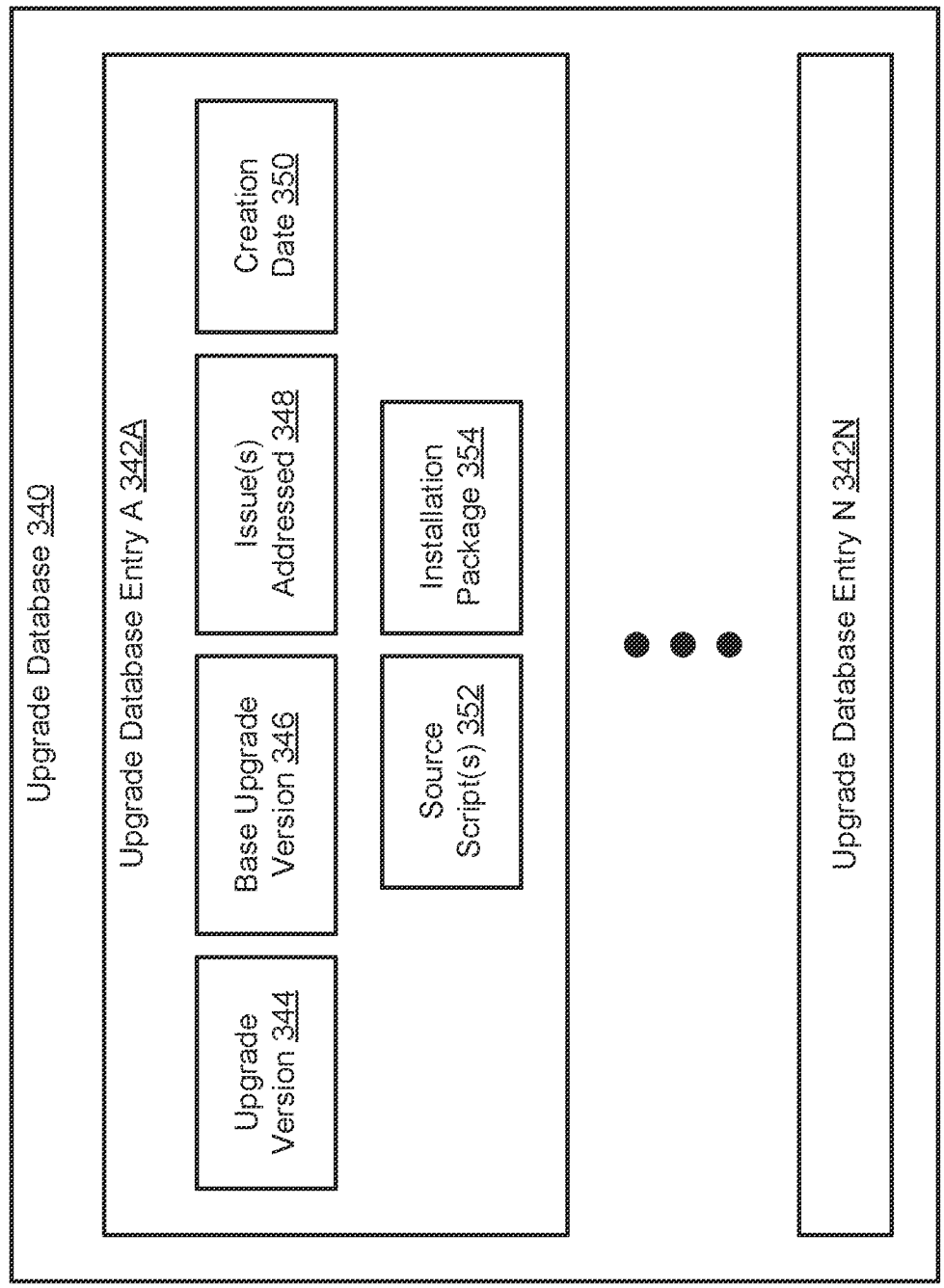
FIG. 3B shows an upgrade database in accordance with one or more embodiments of the invention.

FIG. 3B shows an upgrade database in accordance with one or more embodiments of the invention. The upgrade database (340) may maintain product upgrade metadata pertinent to one or more product upgrades. A product upgrade may refer to any replacement of an enterprise IT product—in the form of hardware, software, and/or firmware—with a newer or better version, which may serve to bring the enterprise IT product up to date, improve the characteristic(s) of the enterprise IT product, and/or resolve any issue(s) (e.g., upgrade issues) inflicting the enterprise IT product and/or the host computing system (e.g., customer environment) whereon the enterprise IT product may be installed. Further, each product upgrade, and thus the product upgrade metadata descriptive thereof, may be consolidated within a given upgrade database entry (342A-342N). For a given product upgrade, the associated upgrade database entry (342A-342N) may include, but is not limited to, an upgrade version (344), a base upgrade version (346), a set of addressed issue identifiers (IDs) (348), a creation date (350), a set of source scripts (352), and an installation package (354). Each of these upgrade database entry (342A-342N) elements is described below.

In one embodiment of the invention, the upgrade version (344) may refer to a version number (described above) (see e.g., FIG. 3A) assigned to a version of a given enterprise IT product that represents the given product upgrade.

In one embodiment of the invention, the base upgrade version (346) may refer to a version number (described above) (see e.g., FIG. 3A) assigned to a version of a given enterprise IT product from which the upgrade version (344) (i.e., the given product upgrade) may be based.

In one embodiment of the invention, an addressed issue ID (348) may refer to a unique character string (e.g., an ordered set of characters, where each character may reflect a letter, a number, or a symbol) assigned to and that identifies an upgrade issue that may be addressed or resolved by the given product upgrade. The given product upgrade may address/resolve one or many upgrade issue(s).

In one embodiment of the invention, the creation date (350) may refer to a timestamp encoding a creation (or release) date and/or time on which the given product upgrade had been introduced.

In one embodiment of the invention, a source script (352) may refer to a set of instructions that defines the given product upgrade and its functionalities, which may often be expressed in a high-level computer programming language. Further, when executed by a compiler, or a computer program configured to translate the set of instructions from the high-level computer programming language into computer readable program code, a source script (352) may enable the compiler to generate a binary file representative of the given product upgrade, which may often be expressed in machine language. A compiler may also include functionality to generate multiple binary files from a source script (352), where each binary file may be compatible with a different operating system.

In one embodiment of the invention, the installation package (354) may refer to a set of computer files, including one or many binary file(s), which collectively facilitate the installation of the given product upgrade onto a host computing system (e.g., a customer environment). When executed by an installer computer program on the host computing system, the installation package (354) may enable the installer computer program to not only install the given product upgrade appropriate to and thus compatible with the host operating system, but also perform other installation relevant functions—e.g., copy any subset or all of the set of computer files forming the installation package (354), register components of the given product upgrade, set security permissions, etc.

While FIG. 3B shows a configuration of subcomponents, other upgrade database (340) configurations may be used without departing from the scope of the invention. For example, one or more upgrade database entries (342A-342N) may include alternative elements therein, such as an inventory part number (not shown) and/or design schematics (not shown) in place of the source script(s) (352) and/or installation package (354). The aforementioned alternative elements may pertain to physical or hardware upgrades (rather than logical or software/firmware upgrades).

Figure 3C:
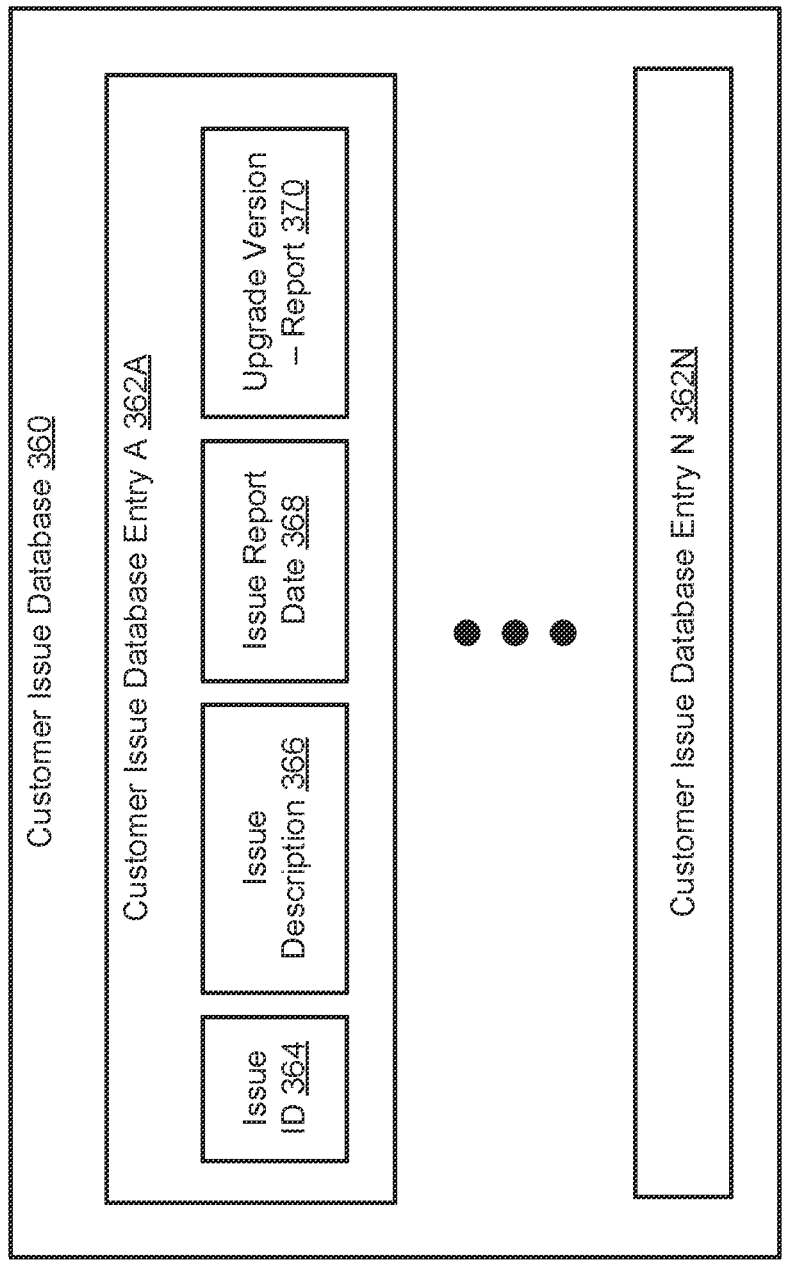
FIG. 3C shows a customer issue database in accordance with one or more embodiments of the invention.

FIG. 3C shows a customer issue database in accordance with one or more embodiments of the invention. The customer issue database (360) may maintain issue metadata portion(s) pertinent to one or more upgrade issues reported by one or more post-upgrade customer environments (described above) (see e.g., FIG. 1). Each upgrade issue, and thus the issue metadata portion descriptive thereof, may be consolidated within a given customer issue database entry (362A-362N). For a given upgrade issue, the associated customer issue database entry (362A-362N) may include, but is not limited to, an upgrade issue identifier (ID) (or issue ID) (364), an issue description (366), an issue report date (368), and a report-relevant upgrade version (370). Each of these customer issue database entry (362A-362N) elements is described below.

In one embodiment of the invention, the upgrade issue ID (364) may refer to a unique character string (e.g., an ordered set of characters, where each character may reflect a letter, a number, or a symbol) assigned to and that identifies the given upgrade issue.

In one embodiment of the invention, the issue description (366) may refer to a concise statement (e.g., one to three sentences) that details the nature or context surrounding the given upgrade issue.

In one embodiment of the invention, the issue report date (368) may refer to a timestamp encoding an earliest date and/or time on which the given upgrade issue had been reported.

In one embodiment of the invention, the report-relevant upgrade version (370) may refer to a version number assigned to a version of a given enterprise IT product that, when installed on one or more customer environments, manifested or caused the given upgrade issue thereon (which ultimately led to the given upgrade issue being reported).

While FIG. 3C shows a configuration of subcomponents, other customer issue database (360) configurations may be used without departing from the scope of the invention.

Figure 3D:
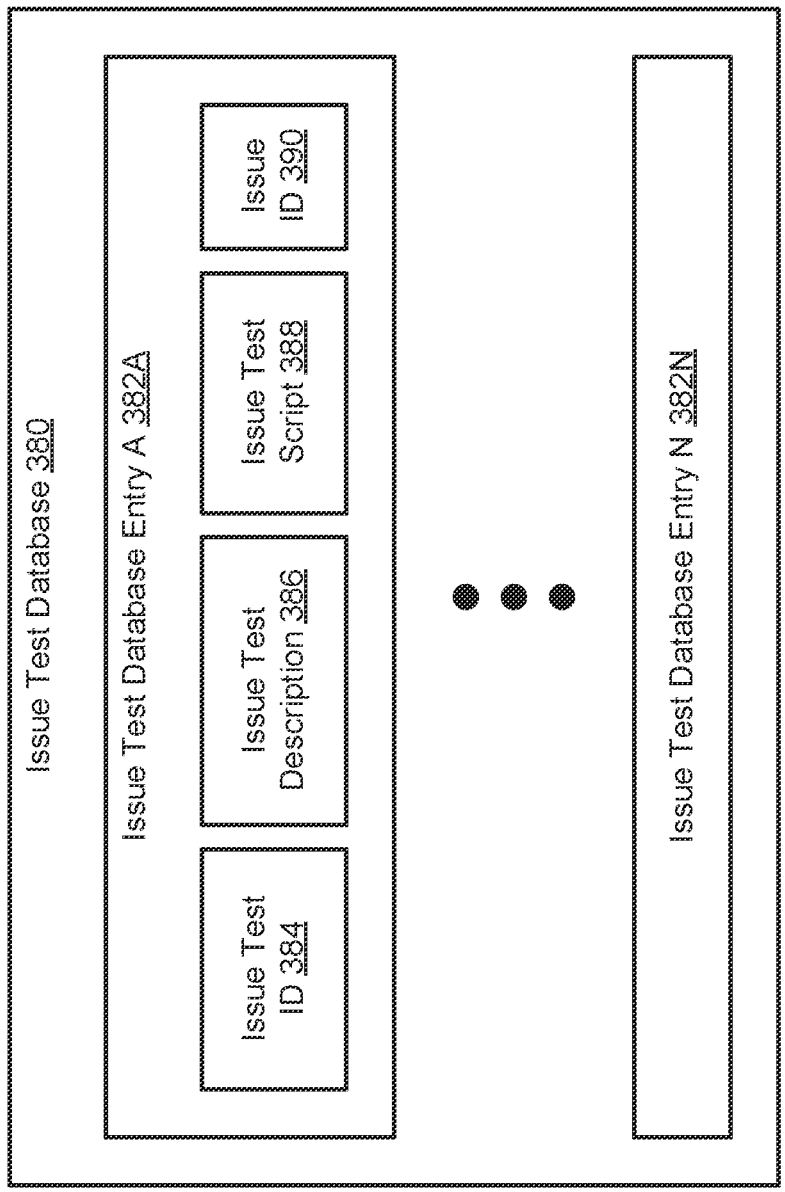
FIG. 3D shows an issue test database in accordance with one or more embodiments of the invention.

FIG. 3D shows an issue test database in accordance with one or more embodiments of the invention. The issue test database (380) may maintain issue test metadata pertinent to one or more upgrade issue tests. An upgrade issue test may refer to a procedure designed to ascertain whether an environmental upgrade issue (from where the upgrade issue test is based) may manifest or arise on a customer environment, at least in part, due to one or more environmental factors thereof. Further, each upgrade issue test, and thus the issue test metadata descriptive thereof, may be consolidated within a given issue test database entry (382A-382N). For a given upgrade issue test, the associated issue test database (382A-382N) may include, but is not limited to, an issue test identifier (ID) (384), an issue test description (386), an issue test script (388), and an upgrade issue ID (or issue ID) (390). Each of these issue test database entry (382A-382N) elements is described below.

In one embodiment of the invention, the issue test ID (384) may refer to a unique character string (e.g., an ordered set of characters, where each character may reflect a letter, a number, or a symbol) assigned to and that identifies the given upgrade issue test.

In one embodiment of the invention, the issue test description (386) may refer to a concise statement (e.g., one to three sentences) that details the nature or context surrounding the given upgrade issue test.

In one embodiment of the invention, the issue test script (388) may refer to a set of instructions that defines the given upgrade issue test, which may often be expressed in a high-level computer programming language. Further, when executed by a compiler, or a computer program configured to translate the set of instructions from the high-level computer programming language into computer readable program code, issue test script (388) may enable the compiler to generate a binary file representative of the given product upgrade, which may often be expressed in machine language. Subsequently, when executed by a computer processor, the binary file may enable the computer processor to perform or conduct the given upgrade issue test.

In one embodiment of the invention, the upgrade issue ID (390) may refer to a unique character string (e.g., an ordered set of characters, where each character may reflect a letter, a number, or a symbol) assigned to and that identifies an upgrade issue based on which the given upgrade issue test had been generated.

While FIG. 3D shows a configuration of subcomponents, other issue test database (380) configurations may be used without departing from the scope of the invention.

Figure 4:
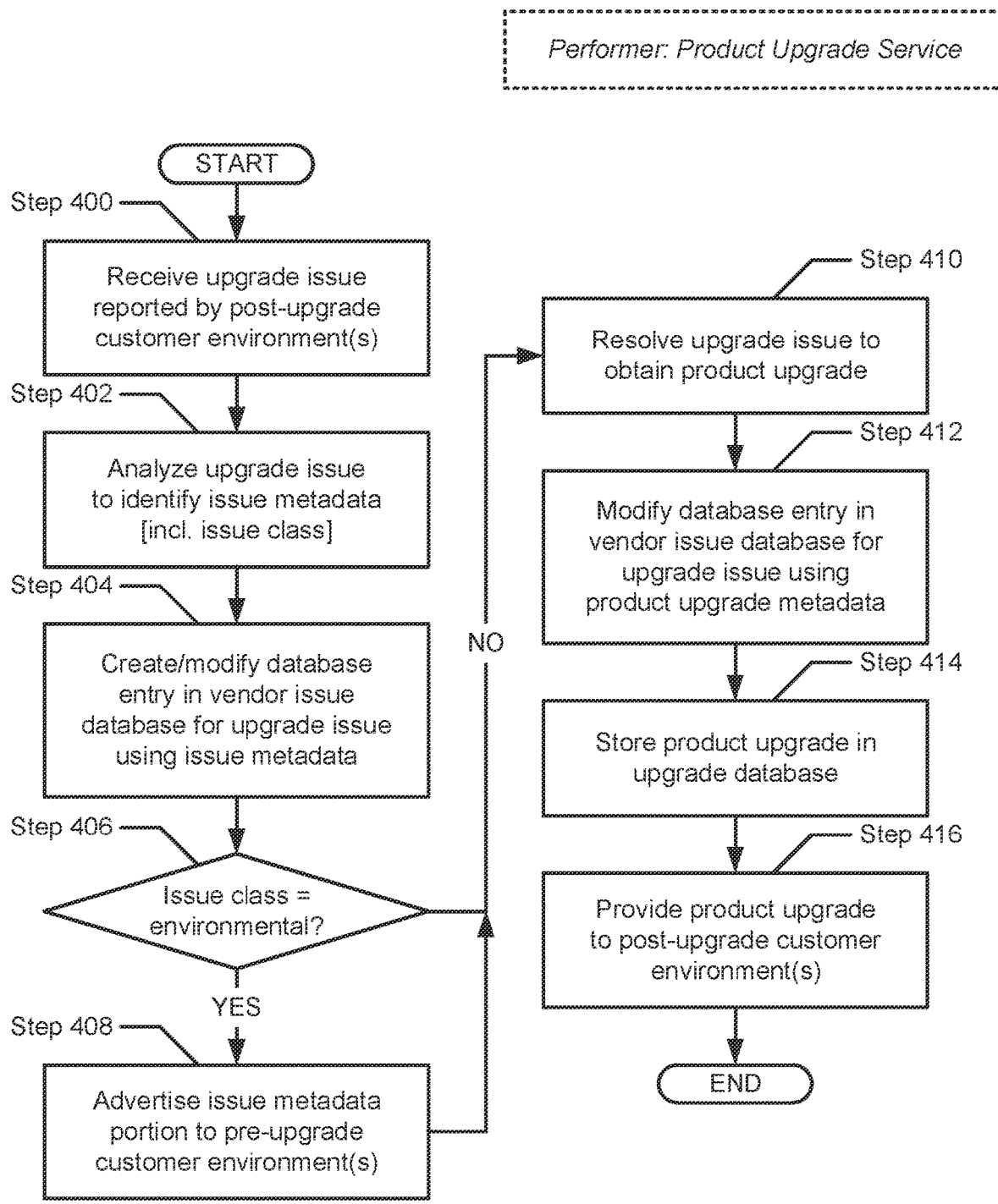
FIG. 4 shows a flowchart describing a method for processing reported upgrade issues in accordance with one or more embodiments of the invention.

FIG. 4 shows a flowchart describing a method for processing reported upgrade issues in accordance with one or more embodiments of the invention. The various steps outlined below may be performed by the product upgrade service (see e.g., FIG. 2A). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, an upgrade issue is received from or reported by one or more post-upgrade customer environments. In one embodiment of the invention, a post-upgrade customer environment may refer to any customer environment (see e.g., FIG. 1) that has completed the installation of a given enterprise IT product. Further, the upgrade issue may refer to any problem, experienced on/by the post-upgrade customer environment(s), which may arise following the installation thereon of the given enterprise IT product.

In Step 402, the upgrade issue (received in Step 400) is analyzed. In one embodiment of the invention, analysis of the upgrade issue may yield the identification of issue metadata. The issue metadata may refer to information descriptive of or pertinent to the upgrade issue. Further, as it pertains to the upgrade issue, the identified issue metadata thereof may include, but is not limited to, an issue identifier (ID), an issue class, an issue description, an issue report date, a report-relevant upgrade version, and a set of customer IDs (described above) (see e.g., FIG. 3A).

In Step 404, a new vendor issue database entry is created, or an existing vendor issue database entry is modified, using the issue metadata (or a portion thereof) (identified in Step 402). That is, in one embodiment of the invention, should a vendor issue database (residing on the vendor environment (see e.g., FIG. 2A)) lack an existing vendor issue database entry for the upgrade issue (received in Step 400), a new vendor issue database entry may be created. Further, the new vendor issue database entry may include the identified issue metadata, as well as an issue advertised flag (see e.g., FIG. 2A) initialized to either a Boolean FALSE value if an issue class of the issue metadata specifies that the upgrade issue is an environmental upgrade issue or an indeterminate NAN value if the issue class alternatively specifies that the upgrade issue is a non-environmental upgrade issue. In another embodiment of the invention, should the vendor issue database include an existing vendor issue database entry for the upgrade issue, the existing vendor issue database entry may be modified or updated to further include the received customer ID (as part of the set of customer IDs).

In Step 406, a determination is made as to whether the issue class (identified in Step 402) reflects that the upgrade issue (received in Step 400) is an environmental upgrade issue or a non-environmental upgrade issue. An environmental upgrade issue may encompass any post-installation (or post-upgrade) problem specific to or experienced by a single enterprise IT environment—examples of which may include, but are not limited to, a lack of permissions to access one or more directories, a lack of storage space to accommodate a logical upgrade installation, and any thermal rises across hardware components. The latter, meanwhile, may encompass any post-installation (or post-upgrade) problem commonly experienced across multiple enterprise IT environments—examples of which may include, but are not limited to, installation package errors that may hinder the installation, in part or in whole, of a logical upgrade; and any upgrade incompatibilities with an operating system and/or hardware configuration. Accordingly, in one embodiment of the invention, if it is determined that the upgrade issue is representative of an environmental upgrade issue, then the method may proceed to Step 408. On the other hand, in another embodiment of the invention, if it is alternatively determined that the upgrade issue is instead representative of a non-environmental upgrade issue, then the method may alternatively proceed to Step 410.

In Step 408, following the determination (made in Step 406) that the upgrade issue (received in Step 400) is representative of an environmental upgrade issue, a portion of the issue metadata (i.e., issue metadata portion) (identified in Step 402) is advertised to one or more pre-upgrade customer environments. In one embodiment of the invention, a pre-upgrade customer environment may refer to any customer environment (see e.g., FIG. 1) that has not yet pursued the installation of the given enterprise IT product (associated with the upgrade issue). Identification of the pre-upgrade customer environment(s) may entail excluding the set of customer IDs (identified in Step 402 or updated in Step 404) from a superset of customer IDs that may be maintained in a customer environment registry on the vendor environment (see e.g., FIG. 2A). Further, the advertised issue metadata portion may include, but is not limited to, the issue ID, the issue description, the issue report date, and the report-relevant upgrade version. Moreover, after advertising the issue metadata portion, the issue advertised flag in the vendor issue database entry (created or modified in Step 404) is changed to a Boolean TRUE value. From here, the method proceeds to Step 410.

In Step 410, following advertisement of the issue metadata portion (performed in Step 408), or the alternative determination (made in Step 406) that the upgrade issue (received in Step 400) is representative of a non-environmental upgrade issue, the upgrade issue is resolved. In one embodiment of the invention, resolution of the upgrade issue may or may not solicit aid or assistance from one or more human elements (e.g., support technicians, engineers, etc.). Further, in resolving or addressing the upgrade issue, a product upgrade for the given enterprise IT product may be obtained.

In Step 412, the vendor issue database entry (created or modified in Step 404) is modified. Specifically, in one embodiment of the invention, product upgrade metadata, descriptive of the product upgrade (obtained in Step 410), may be added to the vendor issue database entry. The product upgrade metadata may include, but is not limited to, an issue patch date and a patch-relevant upgrade version (described above) (see e.g., FIG. 3A).

In Step 414, the product upgrade (obtained in Step 410), along with other product upgrade metadata, are stored in an upgrade database on the vendor environment (see e.g., FIG. 2A). That is, in one embodiment of the invention, a new upgrade database entry, within the upgrade database, may be created to maintain the product upgrade and the other product upgrade metadata. The product upgrade may take form as a set of source scripts and/or an installation package, whereas the other product upgrade metadata may include, but is not limited to, an upgrade version, a base upgrade version, a set of addressed issue IDs, and a creation date (each described above) (see e.g., FIG. 3B).

In Step 416, the product upgrade (or more specifically, the installation package thereof) is provided to the post-upgrade customer environment(s) whom reported the upgrade issue (received in Step 400).

Figure 5A:
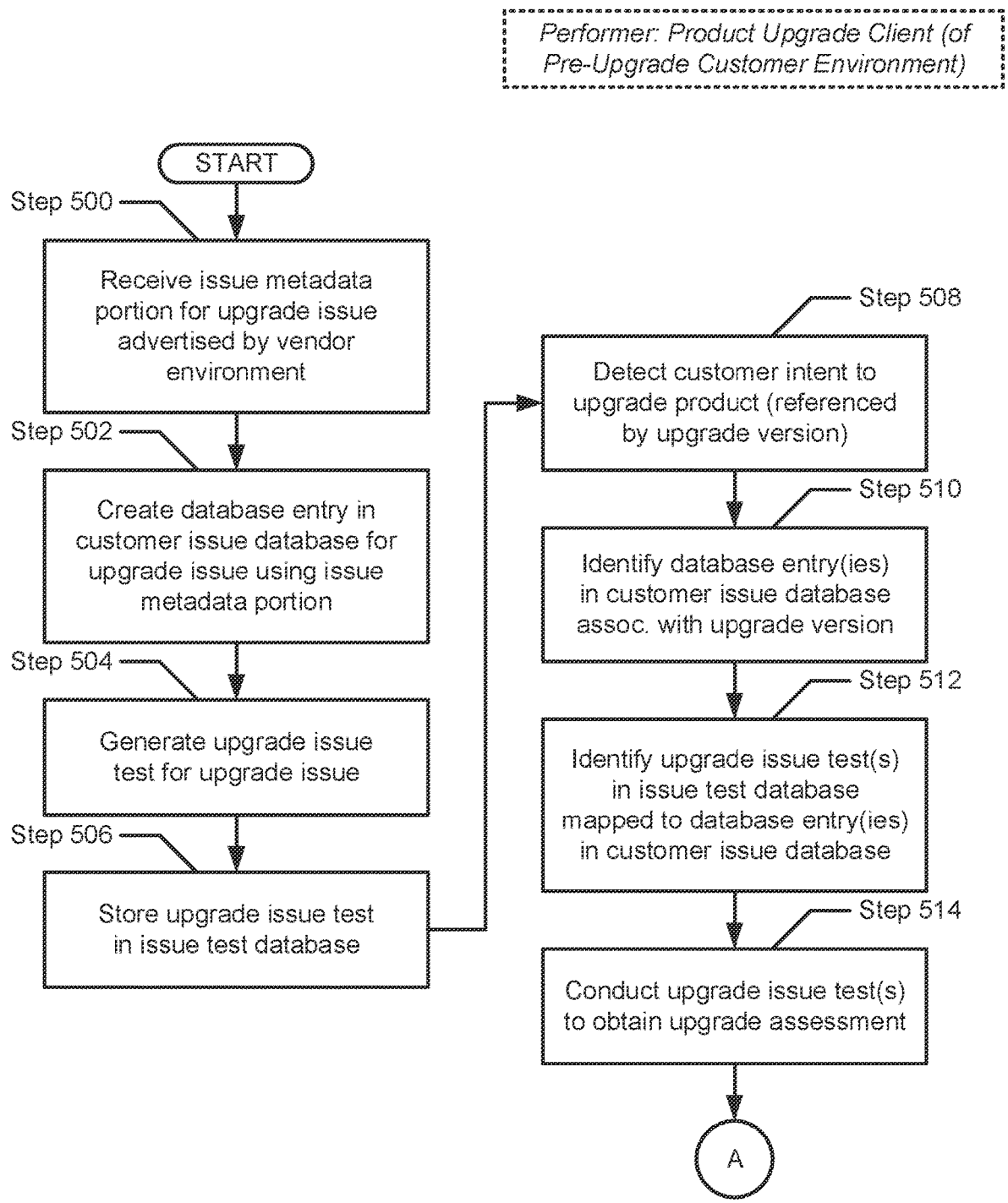
FIGS. 5A and 5B show flowcharts describing a method for predicting post-upgrade outcomes in information technology environments through proactive upgrade issue testing in accordance with one or more embodiments of the invention.
Figure 5B:
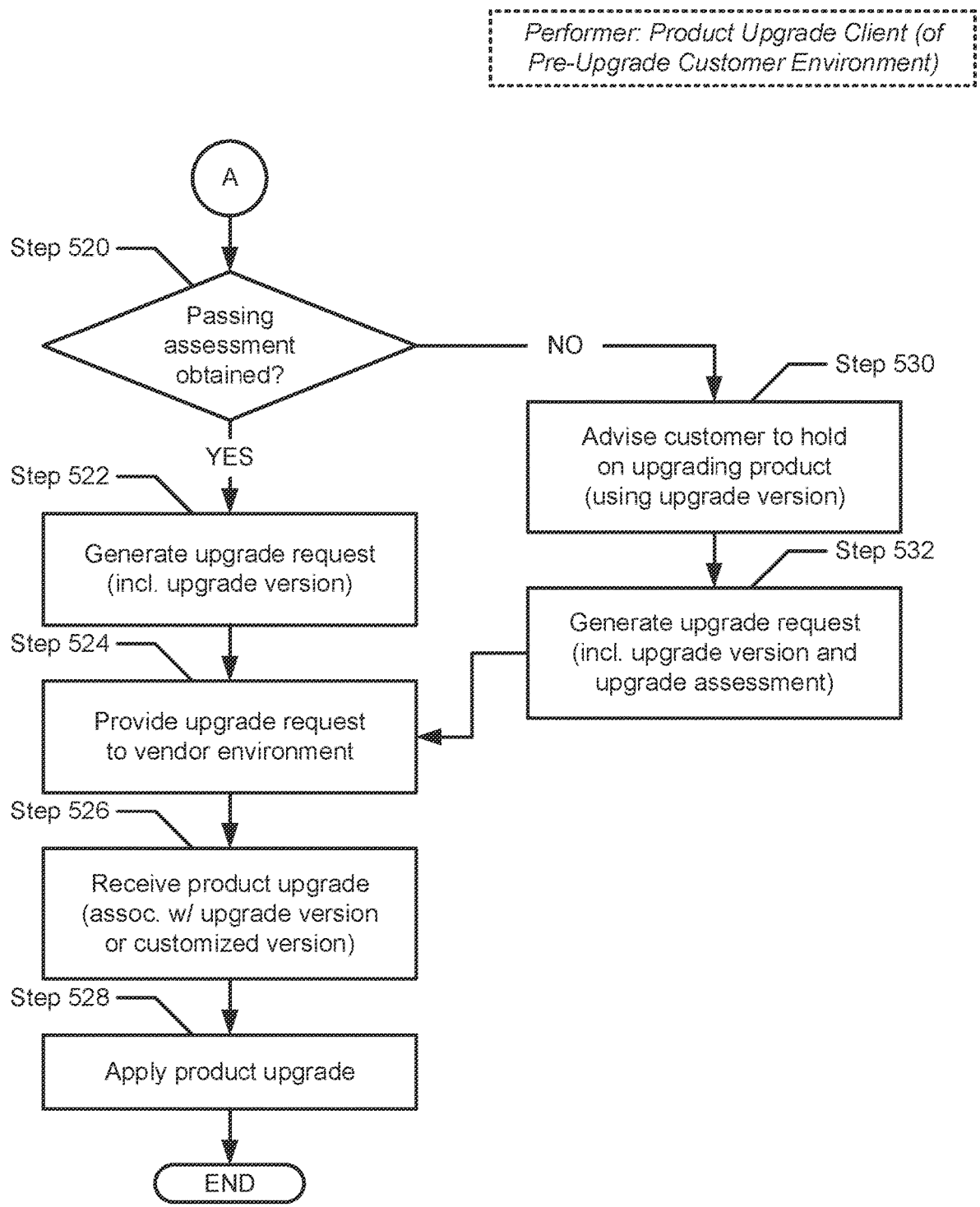

FIGS. 5A and 5B show flowcharts describing a method for predicting post-upgrade outcomes in information technology environments through proactive upgrade issue testing in accordance with one or more embodiments of the invention. The various steps outlined below may be performed by a product upgrade client of any pre-upgrade customer environment (see e.g., FIG. 2B). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, a portion of issue metadata (i.e., an issue metadata portion) is received from or advertised by a product upgrade service on a vendor environment (see e.g., FIG. 2A). In one embodiment of the invention, the issue metadata portion may refer to a subset of issue metadata descriptive of or pertinent to an upgrade issue. The upgrade issue, in turn, may refer to any problem, experienced on/by one or more post-upgrade customer environment, which may have arisen thereon following the installation thereon of any given enterprise IT product. Further, the issue metadata portion may include, but is not limited to, an issue ID, an issue description, an issue report date, and an report-relevant upgrade version (each described above) (see e.g., FIG. 3C).

In Step 502, a customer issue database on the pre-upgrade customer environment is updated. Specifically, in one embodiment of the invention, a new customer issue database entry, within the customer issue database, may be created to maintain the issue metadata portion (received in Step 500).

In Step 504, an upgrade issue test, for the advertised upgrade issue, is generated. In one embodiment of the invention, the upgrade issue test may refer to a procedure designed to ascertain whether the advertised upgrade issue (from where the upgrade issue test is based) may manifest or arise on the pre-upgrade customer environment, at least in part, due to one or more environmental factors thereof. Further, generation of the upgrade issue test may utilize at least a subset of the issue metadata portion (received in Step 500).

In Step 506, the upgrade issue test (generated in Step 504), along with issue test metadata descriptive of the upgrade issue test, are stored in an issue test database on the pre-upgrade customer environment (see e.g., FIG. 2B). In one embodiment of the invention, a new issue test database entry, within the issue test database, may be created to maintain the generated upgrade issue test and the issue test metadata thereof. The upgrade issue test may take form as an issue test script, whereas the issue test metadata may include, but is not limited to, an issue test ID, an issue test description, and an upgrade issue ID (each described above) (see e.g., FIG. 3D).

In Step 508, customer (e.g., a user or administrator of the pre-upgrade customer environment) intent, to upgrade a given enterprise IT product currently installed on or across the pre-upgrade customer environment, is detected. In one embodiment of the invention, the detected customer intent may reference a sought later version (also referred to as an upgrade version) to a currently installed version of the given enterprise IT product.

In Step 510, one or more customer issue database entries, within the customer issue database on the pre-upgrade customer environment, is/are identified. In one embodiment of the invention, the identified customer issue database entry (entries) may each include, and thus may be associated with, the upgrade version (detected alongside the customer intent in Step 508) (i.e., report-relevant upgrade version=upgrade version).

In Step 512, one or more upgrade issue tests is/are identified. In one embodiment of the invention, identification of the upgrade issue test(s) may entail: retrieving an upgrade issue ID from each customer issue database entry (identified in Step 510) to obtain a set of upgrade issue IDs; identifying a set of issue test database entries, within the issue test database on the pre-upgrade customer environment, where each identified issue test database entry may include one of the upgrade issue IDs of the obtained set of upgrade issue IDs; and retrieving an issue test script (described above) (see e.g., FIG. 3D) from each identified issue test database entry to identify the upgrade issue test(s).

In Step 514, the upgrade issue test(s) (identified in Step 512) is/are conducted. In one embodiment of the invention, each upgrade issue test may be conducted by executing the retrieved issue test script for the upgrade issue test. Further, in executing each retrieved issue test script, a test result for the upgrade issue test may be obtained. An upgrade assessment, accordingly, may be produced, which may include the test result or score for each of the one or more identified upgrade issue tests. From here, the method proceeds to Step 520 (see e.g., FIG. 5B).

Turning to FIG. 5B, in Step 520, a determination is made as to whether the upgrade assessment (produced in Step 514) is representative of a passing or failing assessment. The determination may, for example, entail aggregating the test result(s) or score(s), within the upgrade assessment, using one or more aggregation functions to obtain an aggregated test result or score; and comparing the aggregated test result/score against a predefined test result/score threshold. A passing assessment, accordingly, may require that the aggregated test result/score meets or exceeds the test result/score threshold; whereas a failing assessment may be defined by the aggregated test result/score falling below the test result/score threshold. Thus, in one embodiment of the invention, if it is determined that the upgrade assessment reflects a passing assessment, then the method proceeds to Step 522. On the other hand, if it is alternatively determined that the upgrade assessment reflects a failing assessment, then the method alternatively proceeds to Step 530.

In Step 522, following the determination (made in Step 520) that the upgrade assessment (produced in Step 514) reflects a passing assessment, an upgrade request is generated. In one embodiment of the invention, the upgrade request may include the upgrade version of the given enterprise IT product sought to be upgraded.

In Step 524, following the generation of the upgrade request (in Step 522 or Step 532 (described below)), the upgrade request is subsequently provided or transmitted to the product upgrade service on the vendor environment. Thereafter, in Step 526, a product upgrade (or more specifically, an installation package thereof) is received from the product upgrade service and in response to the upgrade request (provided in Step 524). In one embodiment of the invention, the product upgrade may be associated with the upgrade version of the given enterprise IT product, which had been sought by way of the customer intent (detected in Step 508). In another embodiment of the invention, the product upgrade may be associated with a custom (or customized) version of the given enterprise IT product, which may address or resolve one or more upgrade issues that reportedly manifested or arisen following the installation of the upgrade version of the given enterprise IT product on one or more other customer environments (i.e., post-upgrade customer environments) having environmental similarities with the pre-upgrade customer environment.

In Step 528, the product upgrade (received in Step 526) is applied or installed onto the pre-upgrade customer environment.

In Step 530, following the alternative determination (made in Step 520) that the upgrade assessment (produced in Step 514) instead reflects a failing assessment, a notification is presented to the customer. Specifically, in one embodiment of the invention, the notification may advise the customer to hold or postpone upgrading the given enterprise IT product using the upgrade version sought by way of the customer intent (detected in Step 508). The notification may elaborate on the aforementioned recommendation by disclosing that at least one upgrade issue, known to result from the installation of the upgrade version on other (post-upgrade) customer environment(s) having one or more environmental similarities with the pre-upgrade customer environment, may also cause problems on the pre-upgrade customer environment. Accordingly, the notification may further advise the customer to wait until a custom (or customized) version of the given enterprise IT product becomes available to then proceed with upgrading the given enterprise IT product.

In Step 532, an upgrade request is generated. In one embodiment of the invention, the upgrade request may include the upgrade version of the given enterprise IT product sought to be upgraded, and the upgrade assessment (produced in Step 514). The upgrade assessment may be examined by the product upgrade service on the vendor environment to identify and address (or patch) one or more upgrade issues known to arise post-installation of the upgrade version on customer environments having certain environmental configurations (e.g., such as the environmental configuration of the pre-upgrade customer environment). From here, the method proceeds to Step 524 (described above).

Figure 6:
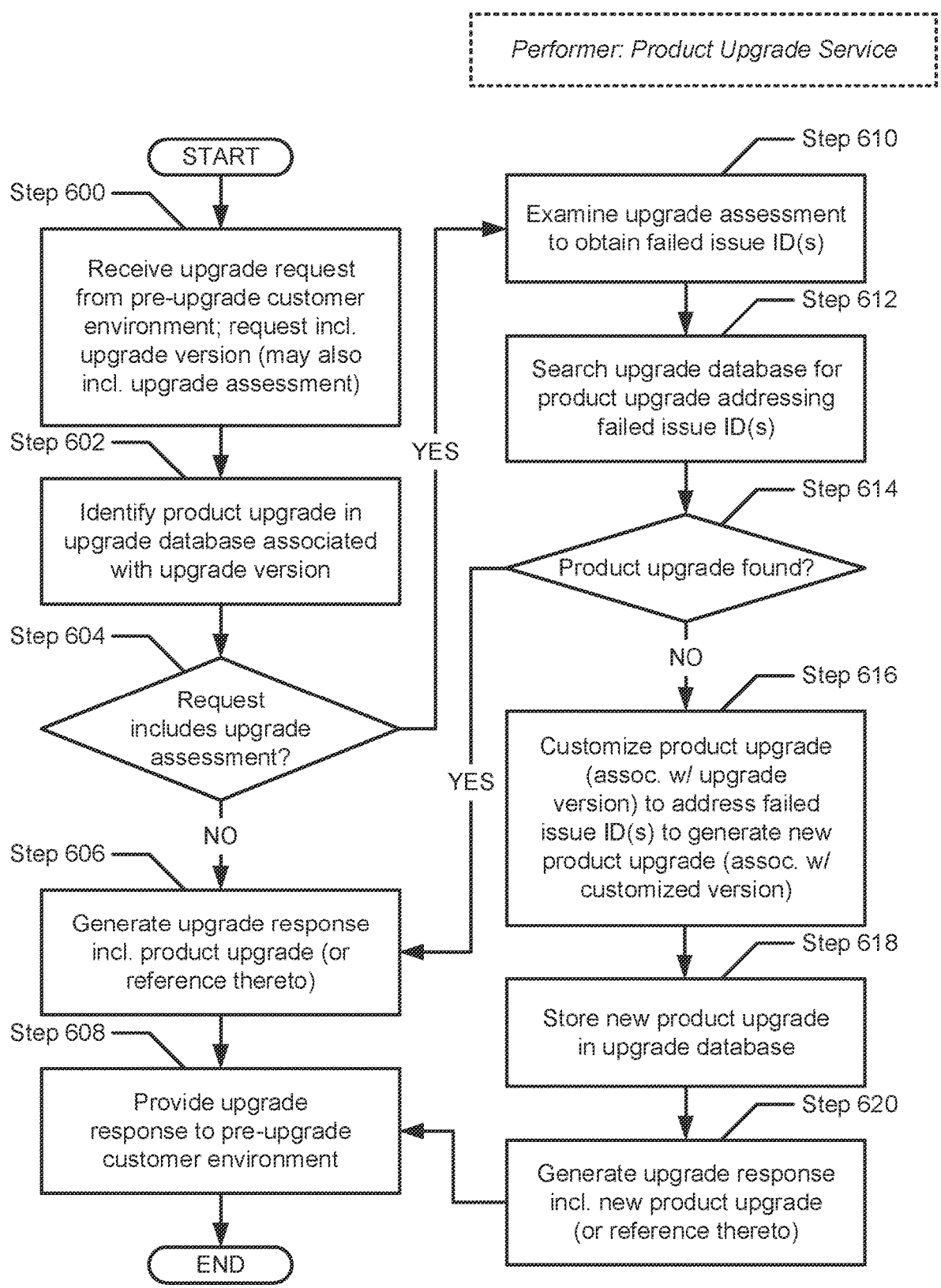
FIG. 6 shows a flowchart describing a method for processing upgrade requests in accordance with one or more embodiments of the invention.

FIG. 6 shows a flowchart describing a method for processing upgrade requests in accordance with one or more embodiments of the invention. The various steps outlined below may be performed by the product upgrade service (see e.g., FIG. 2A). Further, while the various steps in the flowchart are presented and described sequentially, one of ordinary skill will appreciate that some or all steps may be executed in different orders, may be combined or omitted, and some or all steps may be executed in parallel.

Turning to FIG. 6, in Step 600, an upgrade request is received from a product upgrade client (see e.g., FIG. 2B) on a pre-upgrade customer environment. In one embodiment of the invention, a pre-upgrade customer environment may refer to any customer environment (see e.g., FIG. 1) that has not yet pursued the installation of a given enterprise IT product. Further, the upgrade request may include a later version (also referred to as an upgrade version) to a currently installed version of the given enterprise IT product at the pre-upgrade customer environment. Moreover, the upgrade request may or may not also include an upgrade assessment. If included, the upgrade assessment may reflect one or more upgrade issue test results/scores for one or more upgrade issue tests, respectively, conducted on the pre-upgrade customer environment. The upgrade issue test(s) may have been performed to ascertain a compatibility of the upgrade version of the given enterprise IT product with the environmental configuration of the pre-upgrade customer environment.

In Step 602, a product upgrade (or more specifically, an installation package thereof), maintained in the upgrade database on the vendor environment (see e.g., FIG. 2A), is identified. In one embodiment of the invention, the product upgrade may be associated with the upgrade version of the given enterprise IT product (received in Step 600) (i.e., upgrade version in upgrade database entry matches received upgrade version).

In Step 604, a determination is made as to whether the upgrade request (received in Step 600) includes or lacks an upgrade assessment (described above). In one embodiment of the invention, if it is determined that an upgrade assessment had not been included in the upgrade request, then the method proceeds to Step 606. On the other hand, in another embodiment of the invention, if it is alternatively determined that an upgrade assessment had been included in the upgrade request, then the method alternatively proceeds to Step 610.

In Step 606, following the determination (made in Step 604) that the upgrade request (received in Step 600) lacks the upgrade assessment, or following the determination (made in Step 614 (described below)) that a product upgrade, within the upgrade database, has been found based on a search thereon (performed in Step 612 (described below)), an upgrade response is generated. In one embodiment of the invention, the upgrade response may include the product upgrade (or the installation package thereof) (identified in Step 602 or Step 614 (described below)).

In Step 608, following generation of an upgrade response (in Step 606 or Step 620 (described below)), the upgrade response is provided to the pre-upgrade customer environment from which the upgrade request had been received.

In Step 610, following the alternative determination (made in Step 604) that the upgrade request (received in Step 600) includes an upgrade assessment, the upgrade assessment is examined. In one embodiment of the invention, as mentioned above, the upgrade assessment may reflect one or more upgrade issue test results/scores for one or more upgrade issue tests, respectively, conducted on the pre-upgrade customer environment, where the upgrade issue test(s) map to the known or reported upgrade issue(s) associated with the installation of an upgrade version of the given enterprise IT product. Further, any subset or all of the upgrade issue test result(s) or score(s), within the upgrade assessment, may each indicate a high likelihood that their respective upgrade issue may be experienced by the pre-upgrade customer environment should the upgrade version be installed thereon. Examination of the upgrade assessment, accordingly, may result in identification of one or more upgrade issue test results/scores that each reflect a failing result/score, which can be mapped to one or more upgrade issues and, further, to one or more upgrade issue IDs (i.e., failed upgrade issue IDs or failed issue IDs), respectively.

In Step 612, a search is performed across the upgrade database, on the vendor environment (see e.g., FIG. 2A), using the failed upgrade issue ID(s) (obtained in Step 610). In one embodiment of the invention, the search may represent an attempt to find an existing product upgrade that at least addresses the upgrade issue(s), assigned to upgrade issue ID(s), respectively, that, in turn, match the failed upgrade issue ID(s).

In Step 614, a determination is made as to whether an existing product upgrade, within the upgrade database, has or has not been found based on the search (performed in Step 612). In one embodiment of the invention, if it is determined that a product upgrade has been found (i.e., which addresses at least all of the upgrade issue(s) mapped to the failed upgrade issue ID(s)), then the method proceeds to Step 606 (described above), where an upgrade response may be generated and may include the found product upgrade (or an installation package thereof). In another embodiment of the invention, if it is alternatively determined that a product upgrade has not been found (i.e., which does not address at least all of the upgrade issue(s) mapped to the failed upgrade issue ID(s)), then the method alternatively proceeds to Step 616.

In Step 616, following the determination (made in Step 614) that a product upgrade, within the upgrade database, has not been found based on the search (performed in Step 612), the product upgrade, associated with the upgrade version (received in Step 600), is customized. That is, in one embodiment of the invention, modifications or enhancements may be made to the upgrade version of the given enterprise IT product (or to the source script(s) thereof) to generate a custom (or customized) version (defined through one or more modified source scripts). Further, the custom version (representative of a new product upgrade) may be modified such that the custom version addresses or provides a patch for at least all of the upgrade issue(s) mapped to the failed upgrade issue ID(s) (identified in Step 610).

In Step 618, the new product upgrade (generated in Step 616) is subsequently stored in the upgrade database on the vendor environment. Specifically, in one embodiment of the invention, a new upgrade database entry, within the upgrade database, may be created to maintain the new product upgrade and any product upgrade metadata descriptive thereof. The new product upgrade may take form as a set of (modified) source scripts and/or an installation package, whereas the product upgrade metadata may include, but is not limited to, the custom version (i.e., in place of the upgrade version), the upgrade version (i.e., in place of the base upgrade version), a set of addressed issue IDs (i.e., including the failed upgrade issue ID(s)), and a creation date.

In Step 620, an upgrade response is generated. In one embodiment of the invention, the upgrade response may include the new product upgrade (or the installation package thereof) (generated in Step 616). From here, the method proceeds to Step 608 (described above).

Figure 7:
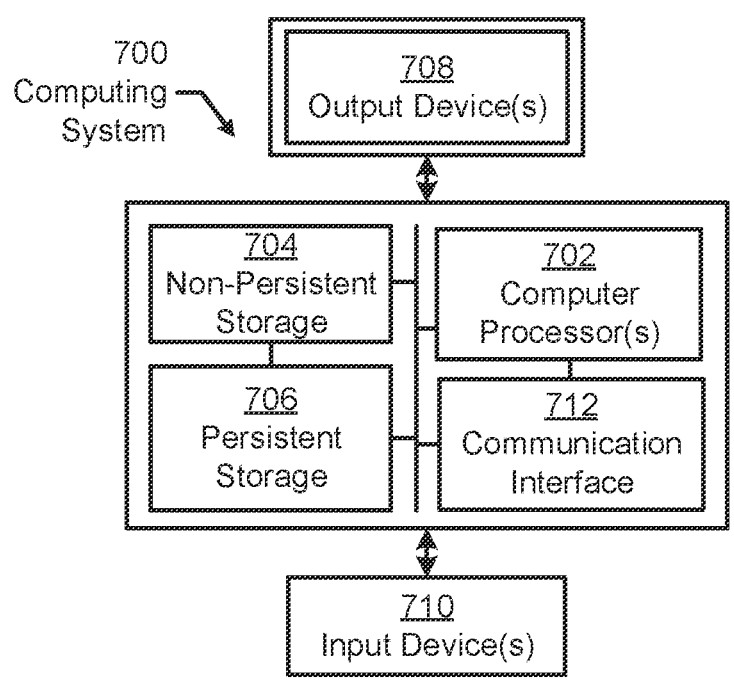
FIG. 7 shows an exemplary computing system in accordance with one or more embodiments of the invention.

FIG. 7 shows an exemplary computing system in accordance with one or more embodiments of the invention. The computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a central processing unit (CPU) and/or a graphics processing unit (GPU). The computing system (700) may also include one or more input devices (710), such as a touchscreen, keyboard, mouse, microphone, touchpad, electronic pen, or any other type of input device. Further, the communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

In one embodiment of the invention, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing upgrades for enterprise information technology (IT) products, the method comprising:
    detecting, from a customer, a customer intent to upgrade a currently installed version of an enterprise IT product to an upgrade version;
    identifying, based on the upgrade version, a set of customer issue database entries;
    identifying a set of upgrade issue tests respectively mapped to the set of customer issue database entries, wherein an issue test script is retrieved using an identified customer issue database entry of the set of customer issue database entries, and wherein the issue test script defines an upgrade issue test, wherein the upgrade issue test is in the set of update issue tests;
    conducting the set of upgrade issue tests to obtain an upgrade assessment;
    making a determination that the upgrade assessment is representative of a failing assessment; and
    advising the customer, based on the determination, to postpone upgrading the enterprise IT product to the upgrade version until a custom version is available.

2. The method of claim 1, wherein each customer issue database entry of the set of customer issue database entries relates to a respective upgrade issue known to manifest following installation of the upgrade version of the enterprise IT product.

3. The method of claim 2, wherein each upgrade issue test of the set of upgrade issue tests comprises a procedure to ascertain one selected from a group consisting of that the respective upgrade issue will manifest based on at least one environmental factor of a customer environment, and that the respective upgrade issue will not manifest on the customer environment.

4. The method of claim 3, wherein the upgrade assessment comprises an upgrade issue identifier (ID) and an upgrade issue test result for each upgrade issue test of the set of upgrade issue tests.

5. The method of claim 2, wherein the upgrade issue is an environmental upgrade issue.

6. The method of claim 1, wherein the custom version of the enterprise IT product addresses at least one upgrade issue known to manifest following installation of the upgrade version of the enterprise IT product.

7. The method of claim 1, the method further comprising:
    submitting, to a product upgrade service, an upgrade request comprising the upgrade version and the upgrade assessment;
    receiving, in return and from the product upgrade service, a product upgrade representative of the custom version of the enterprise IT product; and
    installing the product upgrade.

8. The method of claim 7, the method further comprising:
    prior to detecting the customer intent:
        receiving, from the product upgrade service, an issue metadata portion descriptive of an upgrade issue known to manifest following installation of the upgrade version of the enterprise IT product; and
        generating, for the upgrade issue, an upgrade issue test of the set of upgrade issue tests based on the issue metadata portion.

9. The method of claim 1, the method further comprising:
    detecting, from the customer, a second customer intent to upgrade a second currently installed version of a second enterprise IT product to a second upgrade version;
    identifying, based on the second upgrade version, a second set of customer issue database entries;
    identifying a second set of upgrade issue tests respectively mapped to the second set of customer issue database entries;
    conducting the second set of upgrade issue tests to obtain a second upgrade assessment;
    making a second determination that the second upgrade assessment is representative of a passing assessment;
    submitting, to a product upgrade service, an upgrade request comprising the upgrade version;
    receiving, in return and from the product upgrade service, a product upgrade representative of the upgrade version of the enterprise IT product; and
    installing the product upgrade.

10. A non-transitory computer readable medium (CRM) comprising computer readable program code, which when executed by a computer processor, enables the computer processor to perform a method for managing upgrades for enterprise information technology (IT) products, the method comprising:
    detecting, from a customer, a customer intent to upgrade a currently installed version of an enterprise IT product to an upgrade version;
    identifying, based on the upgrade version, a set of customer issue database entries;

identifying a set of upgrade issue tests respectively mapped to the set of customer issue database entries, wherein an issue test script is retrieved using an identified customer issue database entry of the set of customer issue database entries, and wherein the issue test script defines an upgrade issue test, wherein the upgrade issue test is in the set of update issue tests;

conducting the set of upgrade issue tests to obtain an upgrade assessment;

making a determination that the upgrade assessment is representative of a failing assessment; and advising the customer, based on the determination, to postpone upgrading the enterprise IT product to the upgrade version until a custom version is available.

11. The non-transitory CRM of claim 10, wherein each customer issue database entry of the set of customer issue database entries relates to a respective upgrade issue known to manifest following installation of the upgrade version of the enterprise IT product.

12. The non-transitory CRM of claim 11, wherein each upgrade issue test of the set of upgrade issue tests comprises a procedure to ascertain one selected from a group consisting of that the respective upgrade issue will manifest based on at least one environmental factor of a customer environment, and that the respective upgrade issue will not manifest on the customer environment.

13. The non-transitory CRM of claim 12, wherein the upgrade assessment comprises an upgrade issue identifier (ID) and an upgrade issue test result for each upgrade issue test of the set of upgrade issue tests.

14. The non-transitory CRM of claim 11, wherein the upgrade issue is an environmental upgrade issue.

15. The non-transitory CRM of claim 10, wherein the custom version of the enterprise IT product addresses at least one upgrade issue known to manifest following installation of the upgrade version of the enterprise IT product.

16. The non-transitory CRM of claim 10, the method further comprising:

submitting, to a product upgrade service, an upgrade request comprising the upgrade version and the upgrade assessment;

receiving, in return and from the product upgrade service, a product upgrade representative of the custom version of the enterprise IT product; and installing the product upgrade.

17. The non-transitory CRM of claim 16, the method further comprising:

prior to detecting the customer intent:

receiving, from the product upgrade service, an issue metadata portion descriptive of an upgrade issue known to manifest following installation of the upgrade version of the enterprise IT product; and generating, for the upgrade issue, an upgrade issue test of the set of upgrade issue tests based on the issue metadata portion.

18. The non-transitory CRM of claim 10, the method further comprising:

detecting, from the customer, a second customer intent to upgrade a second currently installed version of a second enterprise IT product to a second upgrade version;

identifying, based on the second upgrade version, a second set of customer issue database entries;

identifying a second set of upgrade issue tests respectively mapped to the second set of customer issue database entries;

conducting the second set of upgrade issue tests to obtain a second upgrade assessment;

making a second determination that the second upgrade assessment is representative of a passing assessment;

submitting, to a product upgrade service, an upgrade request comprising the upgrade version;

receiving, in return and from the product upgrade service, a product upgrade representative of the upgrade version of the enterprise IT product; and installing the product upgrade.

19. A system, the system comprising:

a customer environment comprising a computer processor; and a product upgrade client executing on the computer processor and programmed to perform a method for managing upgrades for enterprise information technology (IT) products, the method comprising:

detecting, from a customer administrating the customer environment, a customer intent to upgrade a currently installed version of an enterprise IT product to an upgrade version;

identifying, based on the upgrade version, a set of customer issue database entries;

identifying a set of upgrade issue tests respectively mapped to the set of customer issue database entries, wherein an issue test script is retrieved using an identified customer issue database entry of the set of customer issue database entries, and wherein the issue test script defines an upgrade issue test, wherein the upgrade issue test is in the set of update issue tests;

conducting the set of upgrade issue tests to obtain an upgrade assessment;

making a determination that the upgrade assessment is representative of a failing assessment; and advising, based on the determination, the customer to postpone upgrading the enterprise IT product to the upgrade version until a custom version is available.

20. The system of claim 19, the system further comprising:

a vendor environment operatively connected to a plurality of customer environments, wherein the plurality of customer environments comprises the customer environment.

* * * * *